US012235597B2

(12) United States Patent
Itabashi et al.

(10) Patent No.: US 12,235,597 B2
(45) Date of Patent: Feb. 25, 2025

(54) DEVELOPING CARTRIDGE CAPABLE OF REDUCING SIZE OF IMAGE FORMING APPARATUS

(71) Applicant: BROTHER KOGYO KABUSHIKI KAISHA, Nagoya (JP)

(72) Inventors: Nao Itabashi, Nagoya (JP); Junichi Yokoi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/633,697

(22) Filed: Apr. 12, 2024

(65) Prior Publication Data

US 2024/0345506 A1 Oct. 17, 2024

Related U.S. Application Data

(63) Continuation of application No. 18/301,293, filed on Apr. 17, 2023, now Pat. No. 11,988,978, which is a (Continued)

(30) Foreign Application Priority Data

Dec. 25, 2015 (JP) ................................ 2015-254201

(51) Int. Cl.

*G03G 15/08* (2006.01)
*G03G 21/16* (2006.01)
*G03G 21/18* (2006.01)

(52) U.S. Cl.

CPC ..... *G03G 15/0867* (2013.01); *G03G 15/0863* (2013.01); *G03G 21/1647* (2013.01); *G03G 21/1896* (2013.01)

(58) Field of Classification Search

CPC ............... G03G 21/1652; G03G 15/80; G03G 21/1867; G03G 2221/166

See application file for complete search history.

(56) References Cited

U.S. PATENT DOCUMENTS 5,110,705 A 5/1992 Hosoya et al.
5,170,213 A 12/1992 Yamaguchi et al.
(Continued)

FOREIGN PATENT DOCUMENTS

CN 102968021 A 3/2013
CN 104471490 A 3/2015
(Continued)

OTHER PUBLICATIONS

Korean Intellectual Property Tribunal and Appeal Board 92nd Panel Decision issued in corresponding Korean application No. 10-2022-7039547, Jun. 26, 2024.

(Continued)

*Primary Examiner* — Sevan A Aydin
(74) *Attorney, Agent, or Firm* — Merchant & Gould P.C.

(57) ABSTRACT

A developing cartridge may include: a casing configured to accommodate developer therein, the casing extending in the first direction; a coupling rotatable about a first axis extending in the first direction, the coupling being positioned at one side of the casing in the first direction; a detection gear rotatable about a second axis extending in the first direction, the detection gear being positioned at another side of the casing in the first direction; and a storage medium including an electric contact surface, the electric contact surface being positioned at the one side of the casing in the first direction.

30 Claims, 8 Drawing Sheets

Related U.S. Application Data continuation of application No. 17/568,337, filed on Jan. 4, 2022, now Pat. No. 11,675,289, which is a continuation of application No. 17/077,147, filed on Oct. 22, 2020, now Pat. No. 11,221,567, which is a continuation of application No. 16/867,612, filed on May 6, 2020, now Pat. No. 11,067,919, which is a continuation of application No. 16/593,623, filed on Oct. 4, 2019, now Pat. No. 10,649,369, which is a continuation of application No. 16/361,519, filed on Mar. 22, 2019, now Pat. No. 10,444,667, which is a continuation of application No. 16/031,011, filed on Jul. 10, 2018, now Pat. No. 10,254,681, which is a continuation of application No. 15/280,614, filed on Sep. 29, 2016, now Pat. No. 10,025,225.

(56) References Cited

U.S. PATENT DOCUMENTS

| | | | |
|---|---|---|---|
| 5,270,786 | A | 12/1993 | Kikuchi et al. |
| 6,289,189 | B1 | 9/2001 | Numagami et al. |
| 7,623,255 | B2 | 11/2009 | Simpson |
| 7,986,897 | B2 | 7/2011 | Nishimura |
| 10,101,684 | B2 | 10/2018 | Kyotani et al. |
| 2006/0193646 | A1 | 8/2006 | Suzuki et al. |
| 2007/0003309 | A1 | 1/2007 | Lee et al. |
| 2008/0317499 | A1 | 12/2008 | Nishimura |
| 2009/0269085 | A1 | 10/2009 | Ukai |
| 2013/0051814 | A1 | 2/2013 | Itabashi |
| 2013/0051815 | A1 | 2/2013 | Itabashi et al. |
| 2013/0051833 | A1 | 2/2013 | Itabashi et al. |
| 2013/0084083 | A1 | 4/2013 | Itabashi et al. |
| 2014/0241736 | A1 | 8/2014 | Shinoya |
| 2015/0063833 | A1 | 3/2015 | Shinagawa |
| 2015/0117873 | A1 | 4/2015 | Mori et al. |
| 2015/0117906 | A1 | 4/2015 | Mori |
| 2017/0184998 | A1 | 6/2017 | Itabashi |

FOREIGN PATENT DOCUMENTS

| | | | |
|---|---|---|---|
| CN | 104487903 | A | 4/2015 |
| CN | 105143994 | A | 12/2015 |
| EP | 2 565 723 | A2 | 3/2013 |
| EP | 2 574 992 | A2 | 4/2013 |
| JP | 2008-242084 | A | 10/2008 |
| JP | 2008-242085 | A | 10/2008 |
| JP | 2009-3174 | A | 1/2009 |
| JP | 2010-157000 | A | 7/2010 |
| JP | 2013-54056 | A | 3/2013 |
| JP | 2013-54062 | A | 3/2013 |
| JP | 2013-54063 | A | 3/2013 |
| JP | 2013-73214 | A | 4/2013 |
| JP | 2014-063080 | A | 4/2014 |
| JP | 2014167570 | A | 9/2014 |
| WO | 2013/031875 | A1 | 3/2013 |

OTHER PUBLICATIONS

Japanese Office Action issued in corresponding JP No. 2023-020074, Jul. 2, 2024.

Extended European Search Report issued in relate EP Application No. 16185126.6, Feb. 1, 2017.

International Search Report and Written Opinion issued in related International Patent Application No. PCT/JP2016/075014, mailed Sep. 27, 2016.

International Preliminary Report on Patentability issued in related International Patent Application No. PCT/JP2016/075014, mailed Jul. 5, 2018.

Office Action issued in related Korean Patent Application No. 10-2018-7021297, mailed May 27, 2019.

Office Action issued in related European Patent Application No. 16 185 126.6, Nov. 13, 2019.

Office Action (Notice of Reason for Refusal) issued in corresponding Korean Patent Application No. 10-2018-7021297, Dec. 23, 2019.

Notification of First Office Action issued in corresponding Chinese Patent Application No. 201611180491.8, May 28, 2020.

Notice of Final Rejection issued in corresponding Korean Patent Application No. 10-2018-7021297, Jul. 7, 2020.

Notice of Final Rejection issued in corresponding Korean Patent Application No. 10-2018-7021297, Sep. 1, 2020.

Office Action issued in corresponding Japanese Patent Application No. 2019-187517, Sep. 29, 2020.

Extended European Search Report issued corresponding European Patent Application No. 20189862.4, Nov. 5, 2020.

Office Action issued in corresponding Chinese Patent Application No. 201611180491.8, Nov. 2, 2020.

Notification to Grant a Patent Right for Invention, Notification of Registration Procedure, and Search Report issued in corresponding Chinese Patent Application No. 201611180491.8, Jan. 19, 2021.

Notification of Reason for Refusal issued in corresponding Korean Patent Application No. 10-2020-7034572, Sep. 15, 2021.

Notice of Reasons for Refusal issued in related Japanese Patent Application No. 2021-074877, mailed Feb. 22, 2022.

Notice of Final Rejection issued in corresponding Korean Patent Application No. 10-2020-7034572, mailed Apr. 15, 2022.

Office Action (Notice of Reasons for Refusal) issued in corresponding Japanese Patent Application No. 2021-074877, Jul. 5, 2022.

Notice of Preliminary Rejection issued in corresponding Korean Patent Application No. 10-2022-7039547, Feb. 13, 2023.

Notice of Final Rejection issued in corresponding Korean application 10-2022-7039547, mailed Aug. 21, 2023.

Extended European Search Report in corresponding European application No. 23195345.6, dated Nov. 20, 2023.

Korean Office Action issued in the corresponding Korean Application No. 10-2022-7039547, mailed Dec. 1, 2023.

Office Action issued in corresponding Japanese Patent Application 2023-020074, Mar. 5, 2024.

Korean Intellectual Property Tribunal and Appeal Board 92nd Panel Decision issued in corresponding Korean application No. 10-2022-70395477039547,Jun. 26, 2024.

DEVELOPING CARTRIDGE CAPABLE OF REDUCING SIZE OF IMAGE FORMING APPARATUS

CROSS-REFERENCE TO RELATED APPLICATION

This application is a continuation of U.S. patent application Ser. No. 18/301,293, filed Apr. 17, 2023, which is a continuation of U.S. patent application Ser. No. 17/568,337, filed Jan. 4, 2022, now U.S. Pat. No. 11,675,289, which is a continuation of U.S. patent application Ser. No. 17/077,147, filed Oct. 22, 2020, now U.S. Pat. No. 11,221,567, which is a continuation of U.S. patent application Ser. No. 16/867,612, filed May 6, 2020, now U.S. Pat. No. 11,067,919, which is a continuation of U.S. patent application Ser. No. 16/593,623, filed Oct. 4, 2019, now U.S. Pat. No. 10,649,369, which is a continuation of U.S. patent application Ser. No. 16/361,519, filed Mar. 22, 2019, now U.S. Pat. No. 10,446,667, which is a continuation of U.S. patent application Ser. No. 16/031,011, filed Jul. 10, 2018, now U.S. Pat. No. 10,254,681, which is a continuation of U.S. patent application Ser. No. 15/280,614, filed Sep. 29, 2016, now U.S. Pat. No. 10,025,225, which claims priority from Japanese Patent Application No. 2015-254201 filed on Dec. 25, 2015. The contents of all prior applications are incorporated herein by reference in their entirety.

TECHNICAL FIELD

The present disclosure relates to a developing cartridge.

BACKGROUND

Conventionally, a developing cartridge is capable of being attached to an image forming apparatus such as a laser printer is known. One conventional developing cartridge accommodates developer therein. The developing cartridge includes an electrode for receiving electric power from the image forming apparatus. The electrode can supply a developing roller with the received electric power from the image forming apparatus. The developing cartridge also includes a coupling. The coupling is configured to receive driving force from the image forming apparatus. The one conventional developing cartridge further includes a detection gear. The detection gear is a gear for transmit, to the image forming apparatus, information representing one or more of specifications of the developing cartridge or information representing as to whether the developing cartridge is a new developing cartridge or not. After the developing cartridge is attached to the image forming apparatus, the coupling receives the driving force from the image forming apparatus, and then, the detection gear can rotate.

Another conventional developing cartridge includes a storage medium (e.g., IC chip). The storage medium can store information representing, for example, a number of printing pages. The another developing cartridge includes a cartridge-side electrical contact portion provided at a contact portion of the detection gear.

SUMMARY

In the other conventional developing cartridge, the coupling, the detection gear and the IC chip are positioned at a first side surface of a casing of the developing cartridge, and the first side surface is positioned at one side of the casing. In this case, the first side surface becomes larger because a lot of components (e.g., the coupling, the detection gear and the IC chip) have to be positioned at the first side surface. That causes the developing cartridge to have a large size. Alternatively, the image forming apparatus also includes a driving unit configured to transmit the driving force to the coupling, an actuator configured to detect the detection gear, and an electrical contact portion configured to read information from the IC chip at an inner surface of the image forming apparatus and the inner surface faces the first side surface of the developing cartridge. Therefore, configurations of the inner surface facing the first side surface may be complex structures and that may cause the image forming apparatus to have a large size.

It is an object of the present disclosure to arrange the coupling, the detection gear and an electric contact surface of the storage medium (e.g., IC chip) in an appropriate manner at the developing cartridge in order that a size of the image forming apparatus becomes smaller. Other objects, features, and advantages will be apparent to persons of ordinary skill in the art from the following detailed description of the disclosure and the accompanying drawings.

DETAILED DESCRIPTION OF EMBODIMENTS

A preferred embodiment of the present invention will be described with reference to drawings. In the following embodiment, an extending direction of a rotation axis of a developing roller will be referred to as a “first direction” A direction perpendicular to the first direction will be referred to as a “second direction”. Specifically, the second direction is defined by a virtual line connecting an agitator shaft 21 of an agitator and a roller shaft 32 of a developing roller 30.

1. Overall Structure of Developing Cartridge

Figure 1:
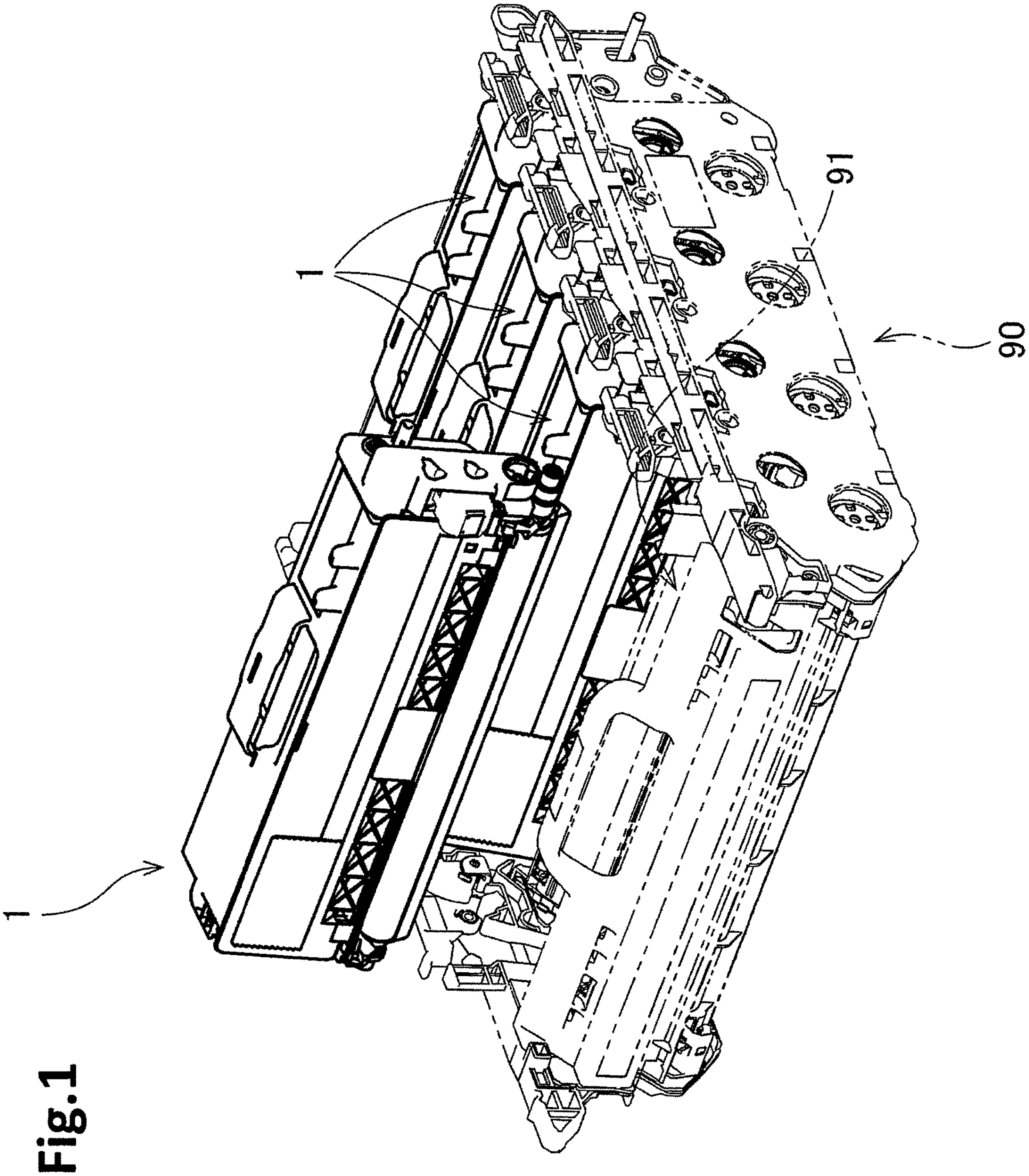
FIG. 1 is a perspective view of a developing cartridge.
Figure 4:
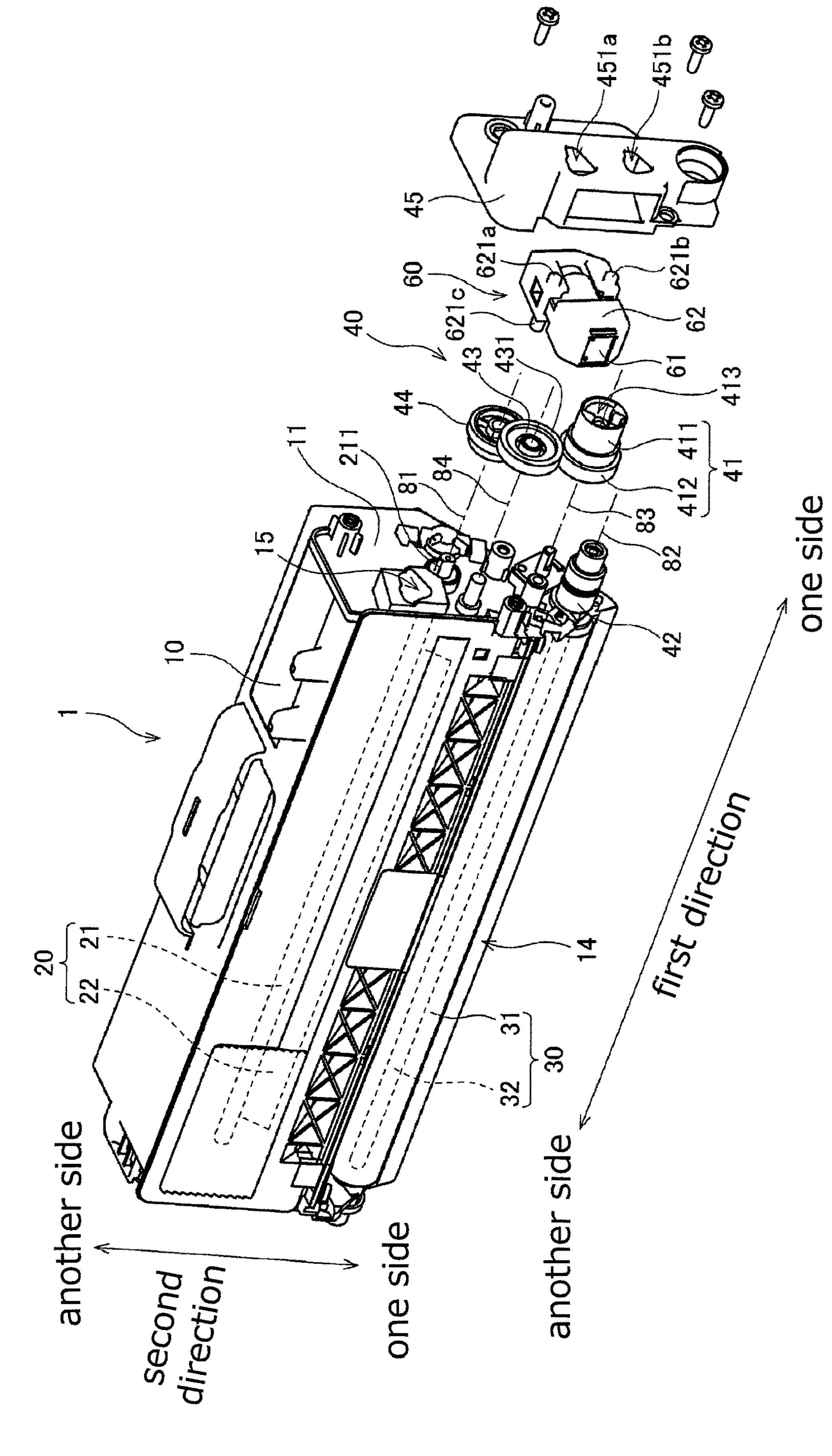
FIG. 4 is an exploded perspective view of an IC (Integrated Circuit) chip assembly.
Figure 5:
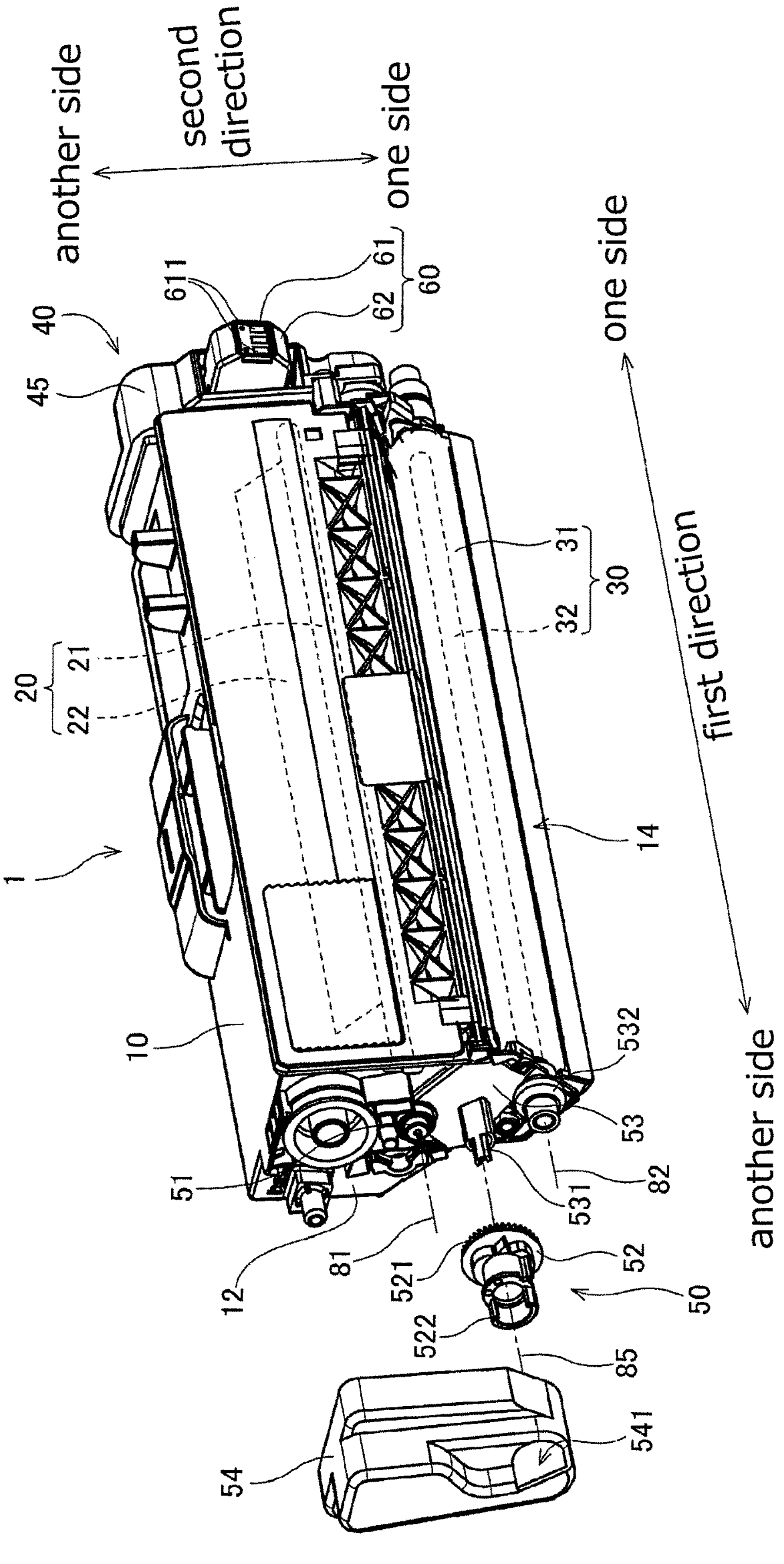
FIG. 5 is a perspective view of the developing cartridge.
Figure 6:
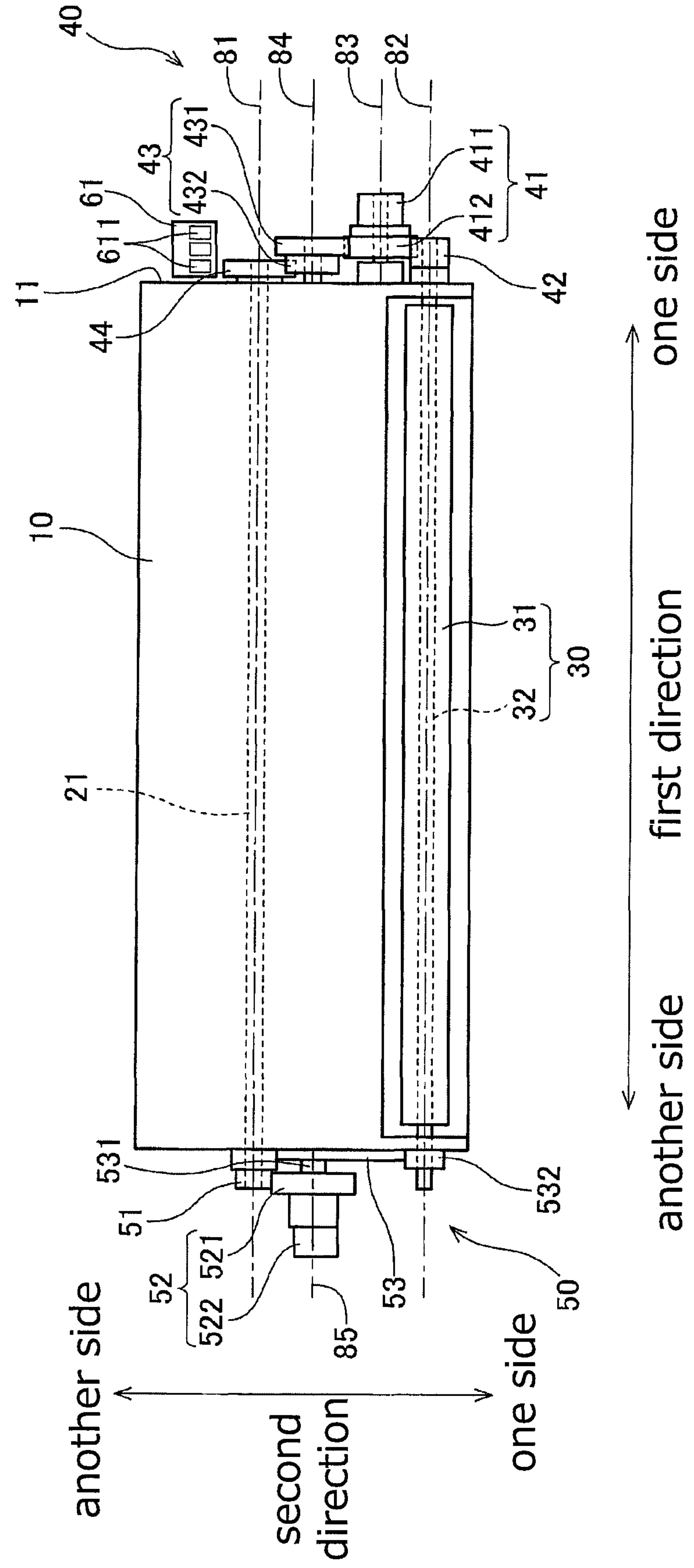
FIG. 6 is a perspective view of the developing cartridge.

FIGS. 1 to 5 are perspective views of a developing cartridge 1. FIG. 6 is a perspective view of positions of a plurality of gears relative to the developing cartridge 1. The developing cartridge 1 is used for an electro-photographic type image forming apparatus (for example, a laser printer or a LED printer), and is a unit for supplying developer (toner, for example) to a photosensitive drum. As shown in FIG. 1, the developing cartridge 1 is attached to a drawer unit 90 of the image forming apparatus.

When the developing cartridge 1 is replaced, the drawer unit 90 is drawn out from a front surface of the image forming apparatus. The drawer unit 90 includes four cartridge holding portions 91, and the developing cartridge 1 is attached to four cartridge holding portions 91, respectively. Each of four cartridge holding portions 91 includes a photosensitive drum.

In the present embodiment, four developing cartridges 1 are attached to one drawer unit 90. Each of the four developing cartridges 1 is configured to accommodate developer therein, and the color of the developer is different colors (cyan, magenta, yellow, and black, for example) among the four developing cartridges respectively. However, the number of developing cartridges 1 that can be attached to the drawer unit 90 may be 1 to 3 or be greater than or equal to 5.

As shown in FIGS. 2 to 5, each developing cartridge 1 according to the present embodiment includes a casing 10, an agitator 20, a developing roller 30, a first gear portion 40, a second gear portion 50, and an IC (Integrated Circuit) chip assembly 60.

The casing 10 is a case configured to accommodate therein developer (toner, for example) for electro-photographic printing. The casing 10 includes a first outer surface 11 and a second outer surface 12. The first outer surface 11 is an outer surface being positioned at one side of the casing 10 in the first direction. The second outer surface 12 is an outer surface being positioned at another side of the casing 10 in the first direction. The first outer surface 11 and the second outer surface 12 are separated from each other in the first direction. The first gear portion 40 and the IC chip assembly 60 are positioned at the first outer surface 11. The second gear portion 50 is positioned at the second outer surface 12. The casing 10 extends in the first direction between the first outer surface 11 and the second outer surface 12. The developing chamber 13 for accommodating the developer is provided in the casing 10. The first direction may be an extending direction of the casing 10. The first direction may be an extending direction of the developing roller 30.

The agitator 20 extends in the first direction. The agitator 20 includes an agitator shaft 21 and an agitation blade 22. The agitator shaft 21 extends along the rotation axis 81 extending in the first direction. The agitator shaft 21 has a columnar shape extending in the first direction. The agitator shaft 21 is an example of a first shaft. The agitation blade 22 expands outward from the agitator shaft 21 in a radial direction. The agitation blade 22 is positioned inside a developing chamber 13 of the casing 10.

As shown in FIG. 4, the agitator shaft 21 includes a first end portion 211 and a second end portion (not shown in the figures). The first end portion 211 is positioned at one end portion of the agitator shaft 21 in the first direction. The first end portion 211 penetrates through the first outer surface 11 of the casing 10. A first agitator gear 44 described later is mounted to the first end portion 211. More specifically, the first agitator gear 44 is mounted to the first end portion 211 so as to be incapable of rotating relative to the first end portion 211. The first agitator 44 is positioned at the first outer surface 11.

The second end portion is positioned at another end portion of the agitator shaft 21 in the first direction. The second end portion penetrates through the second outer surface 12 of the casing 10. A second agitator gear 51 described later is mounted to the second end portion. More specifically, the second agitator gear 51 is mounted to the second end portion so as to be incapable of rotating relative to the second end portion. The second agitator 51 is positioned at the second outer surface 12.

Accordingly, the agitator shaft 21 and the agitation blade 22 are rotatable with the first agitator gear 44 and the second agitator gear 51. The developer which is accommodated in the developing chamber 13 is agitated by rotation of the agitation blade 22. Instead of the agitation blade 22, the agitator may include an agitation film.

The developing roller 30 is rotatable about a rotation axis 82 extending in the first direction. The developing roller 30 according to the present embodiment includes a roller body 31 and a roller shaft 32. The roller body 31 is a cylinder-shaped member extending in the first direction. The roller body 31 is made of an elastic rubber, for example. The roller shaft 32 is a cylindrical member penetrating through the roller body 31 in the first direction. The roller shaft 32 is made of metal or conductive resin. The roller body 31 is fixed to the roller shaft 32 so as to be incapable of rotating relative to the roller shaft 32. When the roller shaft 32 rotates, the roller body 31 rotates together with the roller shaft 32.

The roller shaft 32 may not penetrate through the roller body 31 in the first direction. For example, each of a pair of roller shafts 32 may extend from each end of the roller body 31 in the first direction.

One end portion of the roller shaft 32 in the first direction is mounted to a developing gear 42 described later so as to be incapable of rotating relative to the developing gear 42. Accordingly, the roller shaft 32 rotates with rotation of the developing gear 42 and the roller body 31 also rotates with the roller shaft 32, when the developing gear 42 rotates The second direction may be defined by a direction parallel to a virtual line connecting the agitator shaft 21 and the roller shaft 32 at the same position in the first direction. The roller shaft 32 is positioned at one side of the agitator shaft 21 in the second direction. The agitator shaft 21 is positioned at another side of the roller shaft 32 in the second direction. The second direction is perpendicular to the first direction.

The casing 10 has an opening 14. The opening 14 communicates between the developing chamber 13 and an exterior of the developing chamber 13. The opening 14 is positioned at one end portion of the casing in the second direction. The developing roller 30 is positioned at the opening 14. That is, the developing roller 30 is positioned closer to one side of the casing 10 than to the center of the casing 10 in the second direction.

When the developing cartridge 1 receives a driving force, the developer is supplied from the developing chamber 13 in the casing 10 onto an outer peripheral surface of the developing roller 30 via a supply roller (omitted in the figure). At this time, the developer is tribocharged between the supply roller and the developing roller 30. On the other hand, bias voltage is applied to the roller shaft 32 of the developing roller 30. Accordingly, static electricity between the roller shaft 32 and the developer moves the developer toward the outer peripheral surface of the roller body 31.

The developing cartridge 1 further includes a layer thickness regulation blade which is omitted in the figure. The layer thickness regulation blade regulates a thin layer of the developer supplied onto the outer peripheral surface of the roller body 31 so that the thickness of the developer becomes constant. Then, the developer on the outer peripheral surface of the roller body 31 is supplied to the photosensitive drum of the drawer unit 90. At this time, the developer moves from the roller body 31 to the photosensitive drum on the basis of an electrostatic latent image formed on the outer peripheral surface of the photosensitive drum. Accordingly, the electrostatic latent image is visualized on the outer peripheral surface of the photosensitive drum.

The first gear portion 40 is positioned at one end portion in the first direction of the casing 10. That is, the first gear portion 40 is positioned at the first outer surface 11. FIG. 4 is a perspective view of the developing cartridge 1 in a state in which the first gear portion 40 is disassembled. As shown in FIG. 4, the first gear portion 40 includes a coupling 41, a developing gear 42, an idle gear 43, a first agitator gear 44, and a first cover 45. As shown in FIG. 4, the coupling 41, the developing gear 42, the idle gear 43 and the first agitator gear are positioned at the first outer surface 11. A plurality of gear teeth of each gear are not illustrated in FIG. 4.

The coupling 41 is a gear for initially receiving the driving force applied from the image forming apparatus. The coupling 41 is rotatable about a rotation axis 83 extending in the first direction. The rotational axis 83 which is a rotational center of the coupling 41 is one example of a first axis. The coupling 41 includes a coupling portion 411 and a coupling gear 412. The coupling portion 411 and the coupling gear 412 are integral with each other and made of a resin, for example.

The coupling portion 411 has a coupling hole 413 recessed in the first direction. The coupling hole 413 is an example of a recessed portion configured to receive driving force from the image forming apparatus. Instead of the coupling hole 413, the coupling portion 411 may have a concave portion which is configured to receive driving force from the image forming apparatus. The coupling gear 412 includes a plurality of gear teeth. The gear teeth are provided on the entire outer peripheral surface of the coupling gear 412 at equal intervals.

When the drawer unit 90 to which the developing cartridge 1 is attached is accommodated in the image forming apparatus, a drive shaft of the image forming apparatus is inserted into the coupling hole 413 of the coupling portion 411. With this configuration, the drive shaft and the coupling portion 411 are connected so as to be incapable of rotating relative to each other. Accordingly, the coupling portion 411 rotates when the drive shaft rotates, and the coupling gear 412 rotates together with the coupling portion 411.

The developing gear 42 is a gear for rotating the developing roller 30. The developing gear 42 is rotatable about a rotation axis extending in the first direction. The developing gear 42 includes a plurality of gear teeth. The gear teeth are provided on the entire outer peripheral surface of the developing gear 42 at equal intervals. At least a portion of the plurality of gear teeth of the coupling gear 412 meshes with at least a portion of the plurality of gear teeth of the developing gear 42. Further, the developing gear 42 is mounted to the end portion of the roller shaft 32 in the first direction so as to be incapable of rotating relative to the roller shaft 32. With this construction, when the coupling gear 412 rotates, the developing gear 42 rotates with the coupling gear 412 and the developing roller 30 also rotates with the developing gear 42.

The idle gear 43 is a gear for transmitting rotational driving force of the coupling gear 412 to the first agitator gear 44. The idle gear 43 is an example of a first idle gear. The idle gear 43 is rotatable about a rotation axis 84 extending in the first direction. As shown in FIG. 6, the idle gear 43 includes a large diameter gear portion 431 and a small diameter gear portion 432. The large diameter gear portion 431 and the small diameter gear portion 432 are arranged in the first direction. The small diameter gear portion 432 is positioned at another side of the large diameter gear portion 431 in the first direction. That is, the small diameter gear portion 432 is positioned between the large diameter gear portion 431 and the first outer surface 11 of the casing 10. In other words, the large diameter gear portion 431 is farther away from the first outer surface 11 than the small diameter gear portion 432 is. A diameter of the small diameter gear portion 432 is smaller than a diameter of the large diameter gear portion 431. In other words, a diameter of an addendum circle of the small diameter gear portion 432 is smaller than a diameter of an addendum circle of the large diameter gear portion 431. The large diameter gear portion 431 and the small diameter gear portion 432 are integral with each other and are made of a resin.

The large diameter gear portion 431 includes a plurality of gear teeth, and the plurality of gear teeth are provided on the entire outer peripheral surface of the large diameter gear portion 431 at equal intervals. The small diameter gear portion 432 includes a plurality of gear teeth, and the plurality of gear teeth are provided on the entire outer peripheral surface of the small diameter gear portion 432 at equal intervals. The number of gear teeth of the small diameter gear portion 432 is less than the number of gear teeth of the large diameter gear portion 431. At least a portion of the plurality of gear teeth of the coupling gear 412 meshes with at least a portion of the plurality of gear teeth of the large diameter gear portion 431. Further, at least a portion of the plurality of gear teeth of the small diameter gear portion 432 meshes with at least a portion of the plurality of gear teeth of the first agitator gear 44. When the coupling gear 412 rotates, the large diameter gear portion 431 rotates together with the coupling gear 412 and the small diameter gear portion 432 rotates together with the large diameter gear portion 431. Also, the first agitator gear 44 rotates with the rotation of the small diameter gear portion 432.

The first agitator gear 44 is a gear for rotating the agitator 20 in the developing chamber 13. The first agitator gear 44 is rotatable about a rotation axis 81 extending in the first direction. The first agitator gear 44 includes a plurality of gear teeth, and the plurality of gear teeth are provided on the entire outer peripheral surface of the first agitator gear 44 at equal intervals. As described above, the at least a portion of the plurality of gear teeth of the small diameter gear portion 432 meshes with the at least a portion of the plurality of gear teeth of the first agitator gear 44. Further, the first agitator gear 44 is mounted to one end portion of the agitator shaft 21 in the first direction so as to be incapable of rotating relative to the agitator shaft 21. With the configuration, when the rotational driving force is transmitted from the coupling 41 to the first agitator gear 44 via the idle gear 43, the first agitator gear 44 rotates and the agitator 20 rotates together with the first agitator gear 44. That is, the agitator 20 including the agitator shaft 21 rotates together with the coupling 41.

In the developing cartridge 1 of this embodiment, the idle gear 43 is positioned between the coupling gear 412 and the first agitator gear 44, however, the idle gear 43 may be omitted. That is, the coupling gear 412 may directly mesh with the first agitator gear 44.

The first cover 45 is positioned at one side of the casing in the first direction. More specifically, the first cover is positioned at the first outer surface. The first cover 45 is fixed to the first outer surface 11 of the casing 10 by screws, for example. The coupling gear 412, the developing gear 42, the idle gear 43, and the first agitator gear 44 are accommodated in a space between the first outer surface 11 and the first cover 45. The coupling hole 413 of the coupling portion 411 is exposed to an outside of the first cover 45. The first cover 45 according to the present embodiment also serves as a holder cover for holding the holder 62 of the IC chip assembly 60 described later. A structure of the first cover 45 as the holder cover will be described later in detail.

The second gear portion 50 is positioned at the other side of the casing 10 in the first direction. In other words, the second gear portion 50 is positioned at the second outer surface 12. FIG. 5 is a perspective view of the developing cartridge 1 in which the second gear portion 50 is exploded. As illustrated in FIG. 5, the second gear portion 50 includes a second agitator gear 51, a detection gear 52, an electrically conductive member 53, and a second cover 54. Note that, in FIG. 5, gear teeth are not illustrated in the second agitator gear 51 and the detection gear 52.

The second agitator gear 51 is for transmitting rotational driving force of the agitator shaft 21 to the detection gear 52. The second agitator gear 51 is rotatable about a rotation axis 81 extending in the first direction. The second agitator gear 51 includes a plurality of gear teeth, and the plurality of gear teeth are provided on the entire outer peripheral surface of the second agitator gear 51 at equal intervals. At least a portion of the plurality of gear teeth of the second agitator gear 51 meshes with at least a portion of a plurality of gear teeth of the detection gear 52. The second agitator gear 51 is mounted to the first end portion of the agitator shaft 21 in the first direction so as to be incapable of rotating relative to the agitator shaft 21. With this configuration, the second agitator gear 51 rotates with rotation of the agitator shaft 21.

The detection gear 52 is a gear for providing information on the developing cartridge 1 for the image forming apparatus. The information on the developing cartridge 1 includes, for example, information as to whether the developing cartridge 1 is a new (unused) cartridge or a used cartridge. The information on the developing cartridge 1 also includes, for example, a product specification of the developing cartridge 1. The product specification of the developing cartridge 1 includes, for example, the number of sheets that can be printed with the developer accommodated in the developing cartridge 1 (i.e. sheet-yield number).

The detection gear 52 is rotatable about a rotation axis 85 extending in the first direction. The rotational axis 85 which is a rotational center of the detection gear 52 is an example of a second axis. The detection gear 52 includes a plurality of gear teeth 521. The gear teeth 521 are provided on a portion of an outer peripheral surface of the detection gear 52. That is, the detection gear 52 is a tooth-less gear, that is, the plurality of gear teeth 521 are provided on one portion of an outer peripheral surface of the detection gear 52. The other portion of the outer peripheral surface of the detection gear 52 does not include a gear tooth.

When the developing cartridge 1 is in an unused state, at least a portion of the plurality of gear teeth of the detection gear 52 can mesh with at least a portion of the plurality of gear teeth of the second agitator gear 51. In this case, the detection gear 52 rotates together with the agitator 20 including agitator shaft 21. For this reason, the detection gear 52 rotates based on the driving force transmitted via the coupling 41 receives driving force, the coupling 41, the idle gear 43, the first agitator gear 44, the agitator 20 and the second agitator gear 51. That is the detection gear 52 is rotatable with the coupling 41.

When the image forming apparatus starts to operate, the developing cartridge 1 is attached to the drawer unit 90 and the drawer unit is inserted into the inside of the image forming apparatus and accommodated in the inside of the image forming apparatus. When the drawer unit 90 to which an unused developing cartridge 1 is attached is attached in the image forming apparatus, the coupling 41 receives driving force and then, the detection gear 52 can rotate by meshing with the second agitator gear 51. When the detection gear 52 rotates at a predetermined angle, the detection gear 52 is disengaged from the second agitator gear 51, rotation of the detection gear 52 is stopped.

When the developing cartridge 1 is in the unused state, the detection gear is in a first position representing that the developing cartridge 1 is in the unused state. When the detection gear 52 is in the first position, at least a portion of the plurality of gear teeth of the detection gear 52 can mesh with at least a portion of the plurality of gear teeth of the second agitator gear 51. When the developing cartridge 1 starts to work in the image forming apparatus, the detection gear 52 rotates from the first position and a second position. Therefore, the detection gear 52 is in the second position representing that the developing cartridge 1 is an used state, after the developing cartridge 1 starts to work. When the detection gear 52 is in the second position, the detection gear 52 does not mesh with the second agitator gear 51. Thus, the detection gear 52 can change between the unused state and the used state and then, the detection gear 52 cannot rotate.

Further, the detection gear 52 may be configured of a movable gear that can move in the first direction. The movable gear may not be limited to a partially toothless gear. In other words, the movable gear includes a plurality of gear teeth, and the plurality of gear teeth are provided on an outer peripheral surface of the movable gear along the circumference of the movable gear. In this case, the movable gear moves in the first direction in accordance with rotation of the movable gear, thereby the movable gear is disengaged from the second agitator gear 51. The movable gear may be moved in the first direction away from the second outer surface 12 or toward the second outer surface 12.

When the drawer unit 90 to which a used developing cartridge 1 is attached is attached in the image forming apparatus, the detection gear 52 cannot rotate because the detection gear 52 is disengaged from the second agitator gear 51.

A gear may be provided between the second agitator gear 51 and the detection gear 52. For example, the second gear portion 50 may further include a second idle gear meshing with both the second agitator gear 51 and the detection gear 52. The second idle gear is positioned at the second outer surface 12. In this case, rotational driving force of the second agitator gear 51 may be transmitted to the detection gear 52 via the second idle gear.

The electrically conductive member 53 is electrically conductive. The electrically conductive member 53 is an example of an electrode. The electrically conductive member 53 is formed of a material such as electrically conductive metal or electrically conductive resin. The electrically conductive member 53 is positioned at the second outer surface 12 of the casing 10. The electrically conductive member 53 includes a gear shaft 531 protruding in the first direction. The gear shaft 531 is positioned at the second outer surface 12. The gear shaft 531 extends in the first direction from the second outer surface 12 along the rotational axis 85. The rotational axis 85 is an example of a second axis. The gear shaft 531 is an example of a second shaft. The detection gear 52 rotates about the gear shaft 531 in a state where the detection gear 52 is supported by the gear shaft 531. The electrically conductive member 53 further includes a bearing portion 532. The bearing portion 532 is in contact with the roller shaft 32 of the developing roller 30.

A portion of the electrically conductive member 53 may be in contact with the roller shaft 32. Alternatively, the roller shaft 32 may be in contact with the electrically conductive member 53 in a state where the roller shaft 32 is inserted into the electrically conductive member 53.

The drawer unit 90 includes an electrically conductive lever (not illustrated) that is in contact with the gear shaft 531 in a state where the developing cartridge 1 is attached to the drawer unit 90. Instead of the drawer unit 90, the image forming apparatus may include the electrically conductive lever. When the lever contacts the gear shaft 531, electrical connection between the lever, and the electrically conductive member 53 is established and electrical connection between the electrically conductive member 53 and the roller shaft 32 is also established. When the image forming apparatus is in operation, electric power is supplied to the roller shaft 32 through the lever, and the roller shaft 32 can keep a prescribed bias voltage. That is, the electrically conductive member 53 including the gear shaft 531 has a function of the electrode supplying the roller shaft 32 with the bias voltage (electric power).

The second cover 54 is positioned at the other side of the casing 20 in the first direction. More specifically, the second cover 54 is positioned at the second outer surface 12. The second cover 54 is fixed to the second outer surface 12 of the casing 10 by a screw, for example. At least a portion of one or more of the second agitator gear 51 and the detection gear 52, and the electrically conductive member 53 are accommodated in a space between the second outer surface 12 and the second cover 54. Therefore, the second cover 54 covers at least a portion of the detection gear 52. The second cover 54 has an opening 541. A portion of the detection gear 52 and a portion of the gear shaft 531 are exposed to the outside through the opening 541. The electrically conductive lever of the drawer unit 90 contacts the detection gear 52 and the gear shaft 531 through the opening 541.

As illustrated in FIG. 5, the detection gear 52 includes a detecting protrusion 522. The detection gear 52 covers a portion of an outer peripheral surface of the gear shaft 531. The protrusion 522 is positioned at another side the plurality of gear teeth 521 in the first direction. The detecting protrusion 522 protrudes in the first direction. The detecting protrusion 522 has a circular arc shape extending along a portion of an addendum circle of the detection gear about the rotation axis of the detection gear 52. Note that the detecting protrusion 522 covers a portion of an outer peripheral surface of the gear shaft 531. The detecting protrusion 522 is rotatable with the detection gear 52.

When the developing cartridge in the unused state is attached to the image forming apparatus, a portion of the gear shaft 531 is exposed to the outside through the opening 541. That is, the lever of the drawer unit 90 is in contact with the gear shaft 531. When the image forming apparatus is in operation and the coupling 41 receives driving force, the detection gear 52 rotates. Then, the detecting protrusion 522 pass through between the lever and the gear shaft 531 according to the rotation of the detection gear 52. The lever is not in contact with the gear shaft 531, when the detecting protrusion 522 is positioned between the lever and the gear shaft 531. After the detection gear 42 further rotates, the detecting protrusion 522 pass through between the lever and the gear shaft 531 and the lever is in contact with the gear shaft 531. When the detection gear 52 rotates at a predetermined angle, the detection gear 52 is disengaged from the second agitator gear 51, rotation of the detection gear 52 is stopped. Therefore, the contact state between the lever and the gear shaft 531 is maintained.

Hence, when the detection gear 52 rotates after a new developing cartridge 1 is attached in the drawer unit 90, the contact state between the lever and the gear shaft 531 changes according to the shape of the detection gear 52. More specifically, the contact state between the lever and the gear shaft 531 changes according to the shape of the detecting protrusion 522 because the detecting protrusion 522 pass through between the lever and the gear shaft according to the rotation of the detection gear 52. Alternatively, the contact state between the lever and the gear shaft 531 changes according to the number of the detecting protrusions 522 which are provided with the detection gear 52 because one or more of detecting protrusions 522 pass through between the lever and the gear shaft according to the rotation of the detection gear 52. The image forming apparatus recognizes the change in the contact state between the lever and the gear shaft 531 to identify whether the attached developing cartridge 1 is new or used and/or the product specification of the mounted developing cartridge 1. That is, the detection gear 52 has a shape representing information regarding a specification of the developing cartridge. For example the specification of the developing cartridge may represent a color of the developer accommodated in the developing cartridge. The detection gear 52 may have a shape representing other information representing a color of the developer accommodated in the developing cartridge.

However, the method for detecting the information on the developing cartridge 1 using the detection gear 52 is not limited to detection of electrical conduction. For example, movement of the lever may be optically detected. Further, the detecting protrusion 522 may be formed to have different circumferential position and length from those in the present embodiment. Further, the detection gear 52 may have a plurality of detecting protrusions 522. The shape of the detection gear 52 may vary according to the product specification of the developing cartridge 1 such as the number of printable sheets. More specifically, the number of the detecting protrusions 522 may be differentiated among a plural type of the developing cartridges, and the product specification regarding each of the developing cartridges may be identified based on the number of the detecting protrusions 522. When each of the plural type of the developing cartridges includes the number of the detecting protrusions 522, circumferential intervals between the plurality of detecting protrusions 522 may be differentiated among the plural type of the developing cartridges. In the above-described case, a circumferential length of each detecting protrusion 522 and/or a radial length of each detecting protrusion 522 may be differentiated based on the product specification regarding each of the developing cartridges. In this way, variations in the number of the detecting protrusions 522 and/or circumferential positions of each of the detecting protrusion 522 enables the image forming apparatus to identify the product specification regarding each of the developing cartridges.

The detection gear 52 may be configured of plural components. For example, the detecting protrusion 522 and the detection gear 52 may be different components. Further, the detection gear 52 may include a detection gear body and a supplemental member that shifts its position relative to the detection gear body in accordance with rotation of the detection gear body. In this case, the supplemental member changes between a first position in which the supplemental member is in contact with the lever and a second position in which the supplemental member is not in contact with the lever in accordance with shifting the position of the supplemental member relative to the detection gear body. As a result, the supplemental member may change the position of the lever.

Further, the detection gear 52 may include a cam, and the cam may contact the detecting protrusion 522. In this case, the cam rotates together with rotation of the detection gear 52, and the rotating cam contacts the detecting protrusion 522. This causes the detecting protrusion 522 to move relative to the detection gear 52. The detecting protrusion 522 may be rotatably attached to a shaft provided at the second outer surface 12 or the second cover 54. Alternatively, the detecting protrusion 522 may have a shaft, and the shaft of the detecting protrusion 522 may be inserted into a hole formed in the second outer surface 12 or the second cover 54 so that the detecting protrusion 522 is rotatably supported by the second outer surface 12 or the second cover 54.

Further, in the present embodiment, the gear shaft 531 extends in the first direction from the second outer surface 12. However, the gear shaft 531 does not need to be in direct contact with the second outer surface 12. For example, the casing 10 may have a through-hole penetrating the second outer surface 12 and a cap attached or fitted with the through-hole, and a gear shaft may extend from the cap in the first direction. In this case, the cap includes the gear shaft protruding in the first direction toward the detection gear 52, and the detection gear 52 rotates about the gear shaft 531 in a state where the detection gear is supported by the gear shaft 531.

2. IC Chip Assembly

Figure 7:
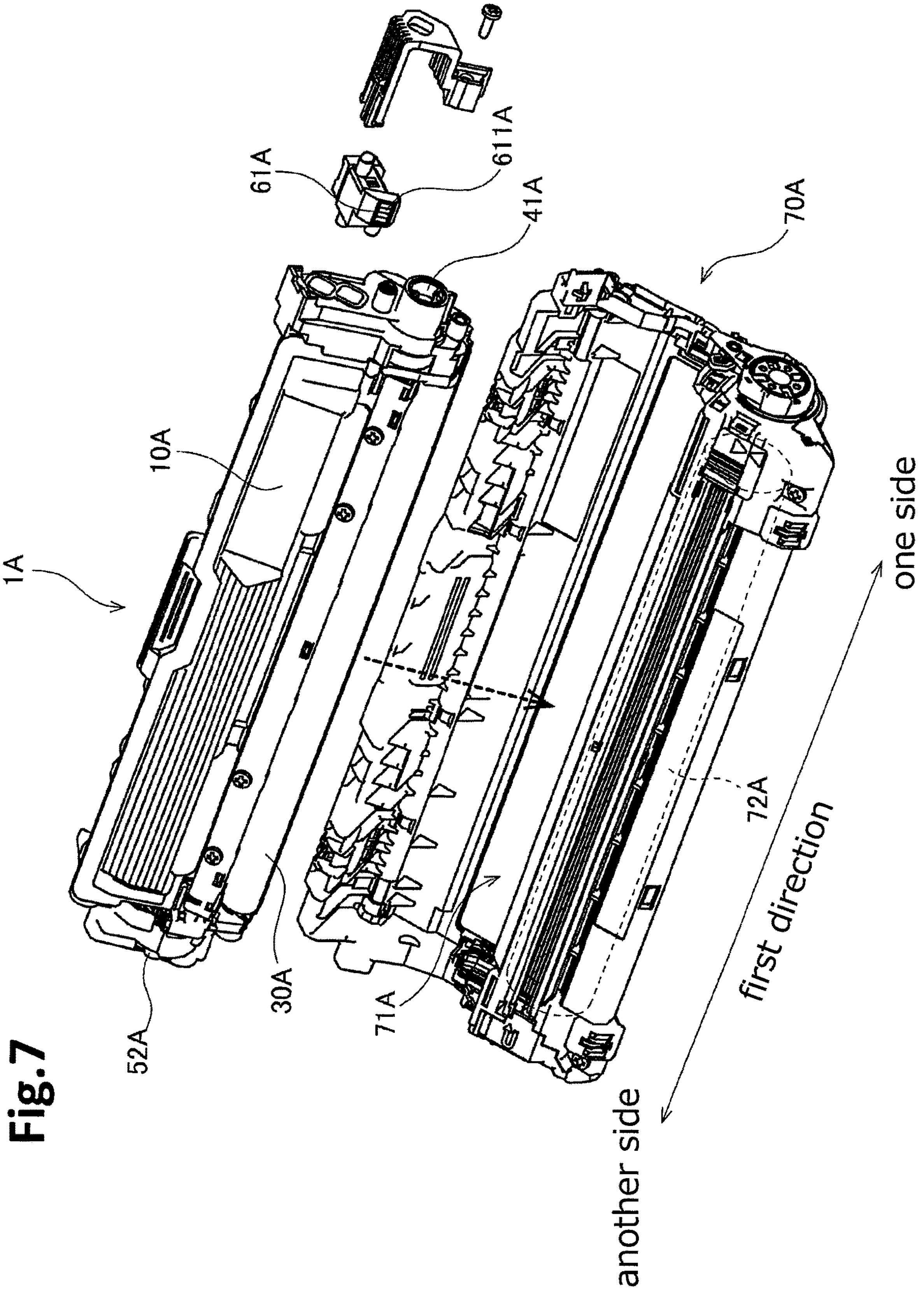
FIG. 7 is a perspective view of a developing cartridge and a drum cartridge according to a modification.

The IC chip assembly 60 is positioned at the one side of the casing in the first direction. The IC chip assembly 60 is positioned at the first outer surface 11 of the casing 10. FIG. 6 is an exploded perspective view of the IC chip assembly 60. FIG. 7 is a cross-sectional view of the IC chip assembly 60 taken along a plane perpendicular to the first direction. As shown in FIGS. 2 through 7, the IC chip assembly 60 includes an IC (Integrated Circuit) chip 61 as a storage medium and a holder 62 for holding the IC chip 61. The holder 62 is held to the first cover 45 at one end of the casing 10 in the first direction. The IC chip 61 stores various information on the developing cartridge 1.

As shown in FIG. 5, the IC chip 61 includes an electric contact surface 611. The electric contact surface 611 is made of electrically conductive metal. The electric contact surface 611 is positioned at one side of the casing 10 in the first direction. The electric contact surface is positioned at the first outer surface.

The drawer unit 90 includes an electric connector. The electric connector is made of metal, for example. The electric connector of the drawer unit 90 contacts the electric contact surface 611 when the developing cartridge 1 is attached to the drawer unit 90. At this time, the image forming apparatus can perform at least one of reading information from the IC chip 61 and writing information in the IC chip 61.

In this developing cartridge 1, both the IC chip 61 and the electric contact surface 611 of the IC chip 61 are positioned at the one side of the casing in the first direction.

Figure 2:
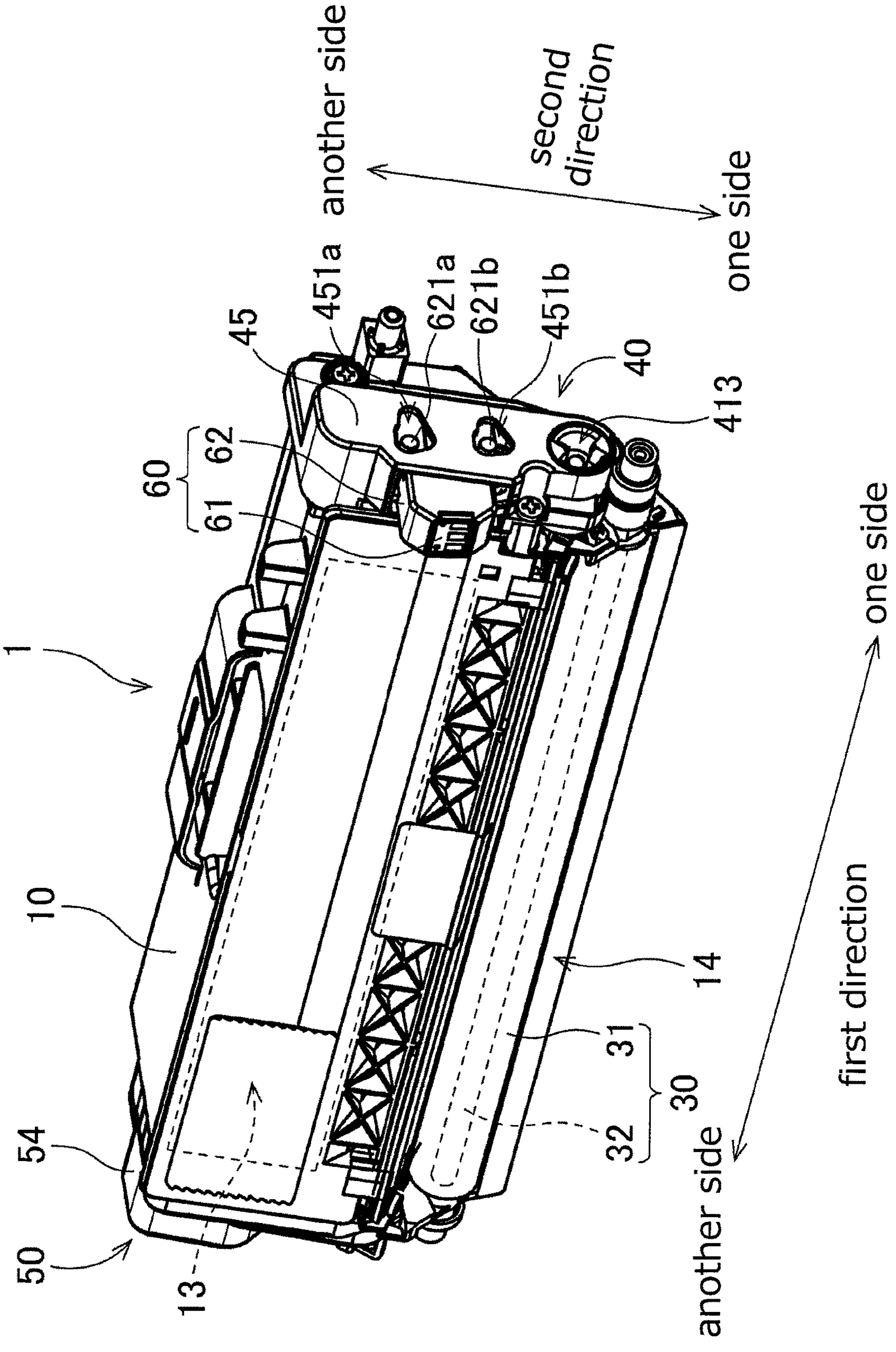
FIG. 2 is a perspective view of the developing cartridge.
Figure 3:
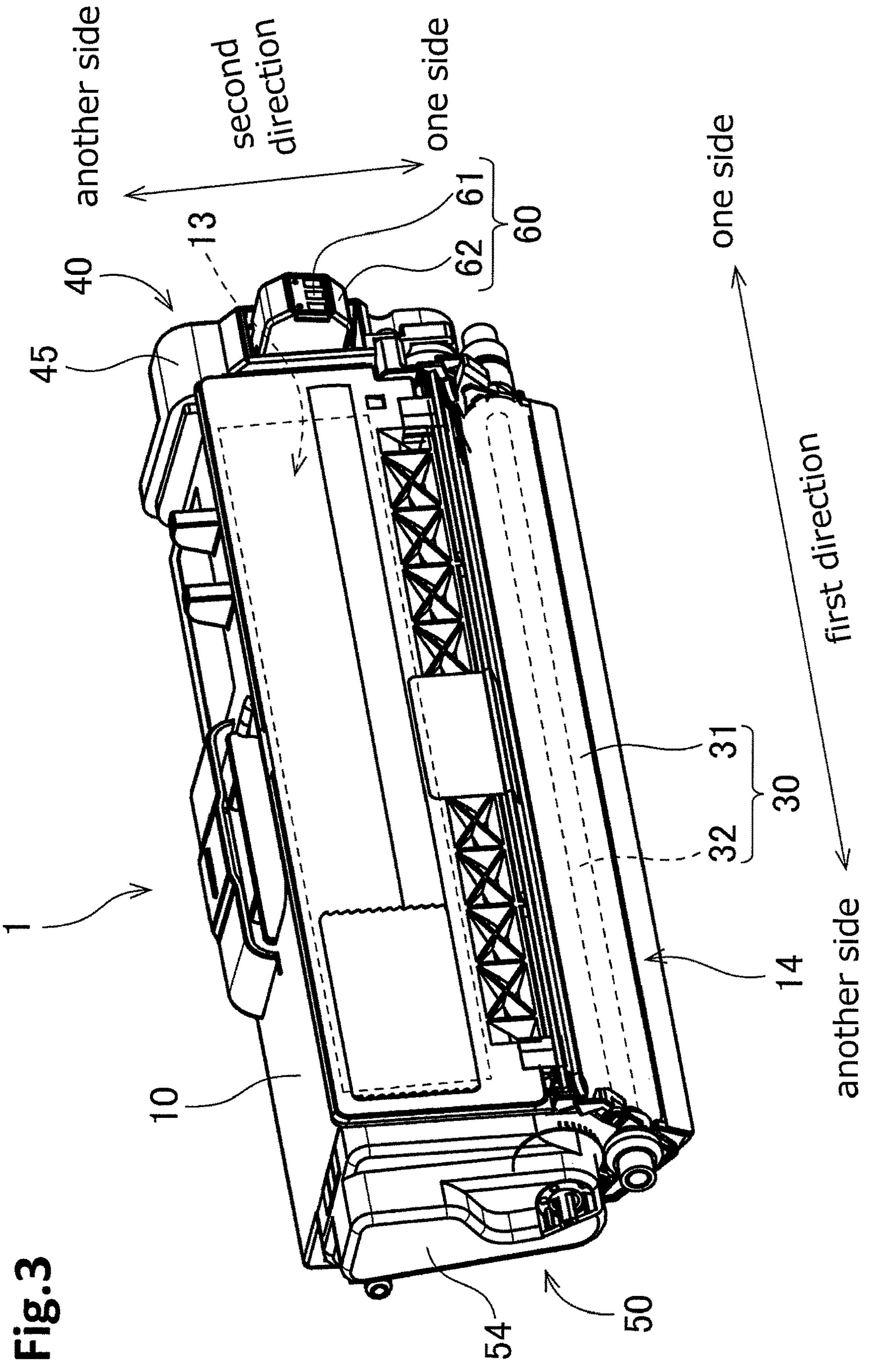
FIG. 3 is a perspective view of the developing cartridge.

At least a portion of the holder 62 is covered by the first cover 45. The holder 62 includes a boss 621*a*, a boss 621*b*, and a boss 621*c*. Each of the boss 621*a* and boss 621*b* extends in the first direction toward the first cover 45 from a surface of the holder 62 opposite to a surface thereof facing the casing 10. The boss 621*a* and boss 621*b* are aligned in the second direction. The boss 621*c* extends in the first direction toward the casing 10 from the surface of the holder 62 facing the casing 10. As shown in FIGS. 2 and 4, the first cover 45 has a through-hole 451*a* and a through-hole 451*b*. The through-hole 451*a* and through-hole 451*b* penetrate the first cover 45 in the first direction, respectively. The through-hole 451*a* and through-hole 451*b* are aligned in the second direction. On the other hand, the casing 10 includes a recessed portion 15. The recessed portion 15 is recessed in the first direction on the first outer surface 11 of the casing 10.

The boss 621*a* is inserted into the through-hole 451*a*. The boss 621*b* is inserted into the through-hole 451*b*. The boss 621*c* is inserted into the recessed portion 15. The through-hole 451*a* has a dimension (inner dimension) larger than a dimension (outside dimension) of the boss 621*a*. The through-hole 451*b* has a dimension (inner dimension) larger than a dimension (outside dimension) of the boss 621*b*. Further, the recessed portion 15 has a dimension (inner dimension) larger than a dimension (outer dimension) of the boss 621*c*. Hence, the holder 62 can move with the bosses 621*a*, 621*b* and 621*c* in direction perpendicular to the first direction relative to the casing 10 and the first cover 45. The holder 62 moves between the first cover 45 and the first outer surface 11

Alternatively, the holder 62 may include a single boss, or three or more bosses. Likewise, the first cover 45 may have a single through-hole, or three or more through-holes. The bosses 621*a*, 621*b* and 621*c* may have a circular columnar shape or a rectangular columnar shape, respectively.

Or, instead of the through-holes 451*a* and 451*b*, the first cover 45 may include one or more of recesses to have the bosses 621*a* and/or 621*b* inserted thereinto.

A projected area of the developing cartridge 1 in the first direction should be smaller in order to down size of the image forming apparatus. That is the first outer surface 11 should be smaller in order to down size of the image forming apparatus. That is the second outer surface 12 also should be smaller in order to down size of the image forming apparatus. On the other hand, it is difficult to arrange the coupling 41, the electric contact surface 611 and the detection gear 52 at one side of the casing 10 in the first direction in a state where at least a portion of the coupling 41, the electric contact surface 611 and the detection gear 52 are overlapping in the first direction, because the coupling 41, each of the electric contact surface 611 and the detection gear is a component for interacting with the image forming apparatus.

As shown in the FIG. 6, in the developing cartridge 1, the detection gear 52 is positioned at the other side of the casing 10 in the first direction, and the coupling 41 and the electric contact surface 611 of the IC chip 61 are also positioned at the one side of the casing 10 in the first direction. Therefore, the first outer surface 11 and the second outer surface 12 become smaller because the coupling 41 and the electric contact surface 611 are positioned at the first outer surface 11 and the detection gear 52 is positioned at the second outer surface 12 which is different from the first outer surface 11.

In this embodiment, the coupling 41 is positioned at one side of the agitator shaft 21 in the second direction, and the coupling 41 is positioned at the one side of the casing in the first direction. The detection gear 52 is positioned at the one side of the agitator shaft 21 in the second direction and the detection gear is positioned at the other side of the casing in the first direction. Therefore, the coupling 41 and the detection gear are positioned at the same side of the agitator shaft 21 in the second direction. For this reason, a length of the developing cartridge in the second direction can be shortened. Accordingly, the developing cartridge 1 can be downsized in the second direction. The image forming apparatus can also be downsized in the second direction.

Specifically, in this embodiment, the detection gear 52 and the electrically conductive member 53 should be the same outer surface (either the first outer surface 11 or the second outer surface 12) of the casing 10, because the detection gear 52 is supported by the electrically conductive member 53. On the other hand, the electrically conductive member 53 (an example of the electrode) receives high electrical voltage (electrical power). For this reason, IC chip 61 is affected by, for example, high-frequency noise, if a distance between the electrically conductive member 53 and the electric contact surface 611 of the IC chip 61 is too short or a distance between the electrically conductive member 53 and the IC chip 61 is too short.

In this embodiment, in the developing cartridge 1, the detection gear 52 and the electrically conductive member 53 are positioned at the second outer surface 12 which is positioned at opposite side of the first outer surface 11 in the first direction, and one or more of the electric surface 611 and the IC chip 61 is positioned at the first outer surface 11. Accordingly, an electrical interference between the between the electrically conductive member 53 and the electric contact surface 611 can be reduced. Alternatively, an electrical interference between the between the electrically conductive member 53 and the IC chip 61 can be reduced. For example, the high-frequency noise on the IC chip 61 can be reduced based on charging the high electrical voltage (electrical power) to the electrically conductive member 53.

In this embodiment, a whole of the IC chip 61 including the electric contact surface 611 is positioned at the first outer surface 11 which is opposite side of the second outer surface 12 in the first direction, the detection gear 52 and the electrically conductive member 53 are positioned at the second outer surface 12. At least the electric contact surface 6111 may be positioned at the first outer surface 11 and the IC chip 61 is positioned at a different position from the first outer surface (e.g., another surface of the casing 10). An electrical interference between the between the electrically conductive member 53 and the electric contact surface 611 can be reduced, if at least the electric contact surface 6111 may be positioned at the first outer surface 11 and the IC chip 61 is positioned at a different position from the first outer surface (e.g., another surface of the casing 10). Alternatively, an electrical interference between the between the electrically conductive member 53 and the IC chip 61 can be reduced. For example, the high-frequency noise on the IC chip 61 can be reduced based on charging the high electrical voltage (electrical power) to the electrically conductive member 53.

3. Modifications

While the description has been made in detail with reference to the specific embodiment thereof, it would be apparent to those skilled in the art that various changes and modifications may be made therein. In the following description, differences between the above embodiment and the modifications are mainly explained.

FIG. 7 is a perspective view showing a developing cartridge 1A and a drum cartridge 70A of a modification. The developing cartridge 1A shown in FIG. 7 includes a casing 10A, a developing roller 30A, a coupling 41A a detection gear 52A, and an IC chip 61A. In the embodiment shown in FIG. 7, the developing cartridge 1A is attached to the drum cartridge 70A instead of the drawer unit. The drum cartridge 70A includes one developing cartridge holding portion 71A holding the developing cartridge 1A. The developing cartridge holding portion 71A includes a photosensitive drum 72A. When the developing cartridge 1A is attached to the drum cartridge 70A, the developing roller 30A of the developing cartridge 1A is in contact with the photosensitive drum 72A.

Figure 8:
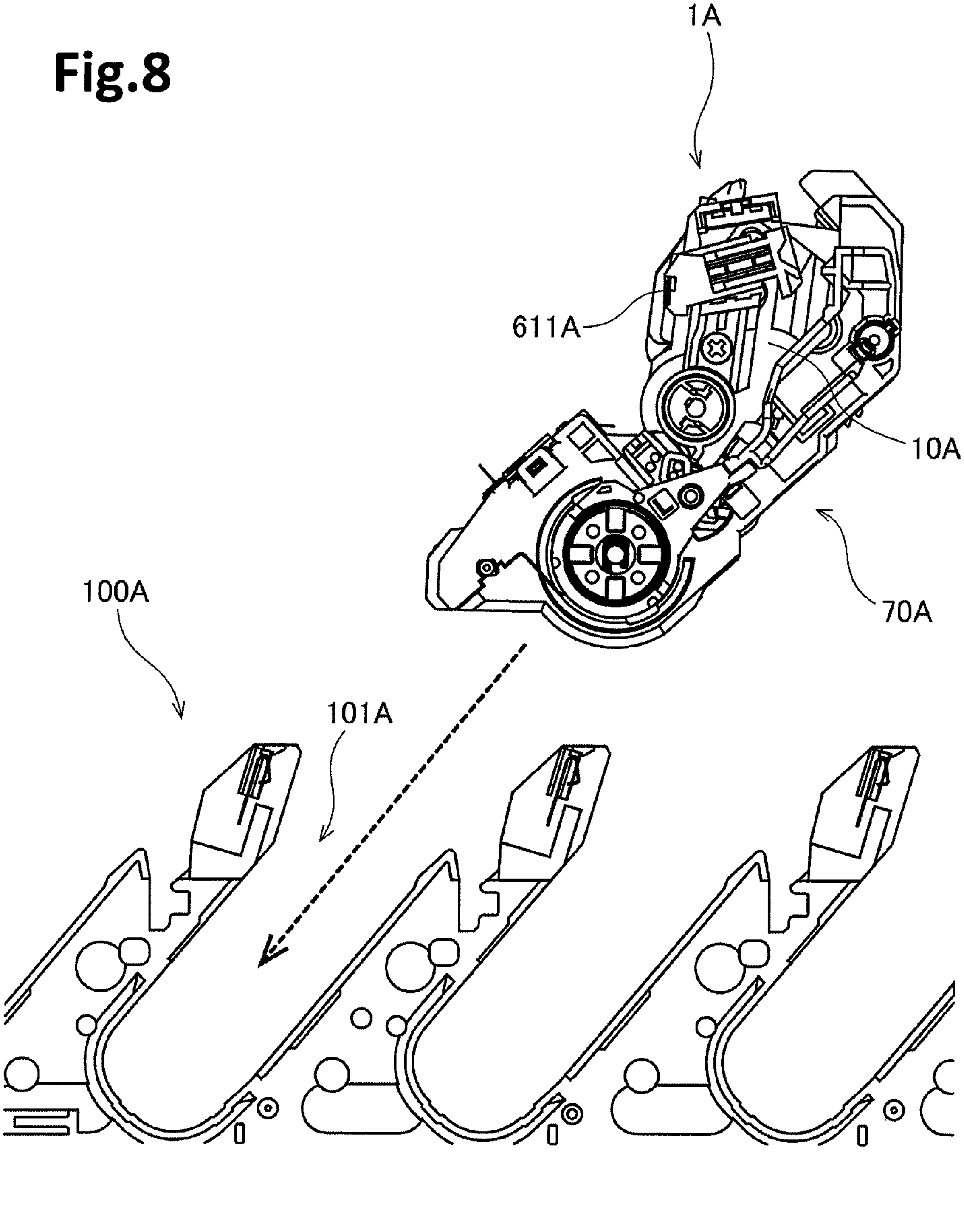
FIG. 8 is a view for illustrating attachment of the drum cartridge to an image forming apparatus in a state where the developing cartridge is attached to the drum cartridge according to the modification.

FIG. 8 is a view showing how to attach the drum cartridge 70A to an image forming apparatus 100A in a state where the developing cartridge 1A is attached to the drum cartridge 70A. As shown in FIG. 8, the drum cartridge 70A is attached to a drum cartridge holding portion 101A provided in the image forming apparatus 100A in a state where the developing cartridge 1A is attached to the drum cartridge 70A.

In the above manner, a similar structure to that of the developing cartridge 1 according to the above embodiment can be applied to the developing cartridge 1A to be attached to the drum cartridge 70A. Specifically, as shown in FIG. 7, in the developing cartridge 1A, the coupling 41A and an electric contact surface 611A of the IC chip 61A are positioned at the one side of the casing 10A in the first direction, and the detection gear 52A is also positioned at the other side of the casing 10A in the first direction. Therefore, the one outer surface and the other outer surface separated from the one outer surface in the first direction become smaller because the coupling 41A and the electric contact surface 611A are positioned at the one outer surface and the detection gear 52A is positioned at the other outer surface which is different from the one outer surface. Accordingly, the developing cartridge 1A can be downsized. The image forming apparatus 100A can also be downsized.

In this embodiment, the gear shaft 531 (an example of the second shaft) extends in the first direction from the second outer surface 12. The gear shaft 531 may not directly contact with the second outer surface 12. For example, the casing 10 may have a through-hole penetrating the second outer surface 12 and a cap being attached to the through-hole. The gear shaft may extend from the cap in the first direction.

In this case the cap may include the gear shaft protruding in the first direction toward the detection gear 52. The detection gear 52 may be rotatable about the gear shaft in a state where the detection gear 53 is supported by the gear shaft.

According to the above-described embodiments, the plural gears provided within each of the first gear portion and the second gear portion are engaged with one another through meshing engagement of the gear teeth. However, the plural gears provided within each of the first gear portion and the second gear portion may be engaged with one another through a frictional force. For example, instead of the plural gear teeth, frictional members, such as rubber members, may be provided to the outer circumferences of two gears that engage with each other.

The developing cartridge 1 in this embodiment is attached to the drawer unit of the image forming apparatus. The developing cartridge may be attached to another image forming apparatus which does not include the drawer unit.

Shapes of the details in the developing cartridge may differ from those shown in the drawings attached to this application. The respective components employed in the above-described embodiment and modifications can be selectively combined together within an appropriate range so that no inconsistency will arise.

What is claimed is:

1. A developing cartridge comprising:

a developing roller rotatable about a first axis extending in a first direction, the developing roller including a roller body extending in the first direction;

a casing configured to accommodate developer therein, the casing having a first side and a second side being spaced apart from the first side in the first direction, the casing having a third side and a fourth side being spaced apart from the third side in a second direction, the first side having an outer surface, the developing roller being positioned at the third side of the casing, the casing having a top surface facing upward and a bottom surface facing downward;

a coupling rotatable about a second axis extending in the first direction, the coupling being positioned at the outer surface, the coupling being spaced apart from the developing roller in the second direction, the coupling including a coupling gear;

an agitator rotatable about a third axis extending in the first direction according to rotation of the coupling, the agitator including an agitator shaft extending in the first direction, the agitator shaft being farther from the developing roller than the second axis is from the developing roller in the second direction;

an agitator gear rotatable with the agitator shaft, the agitator gear being positioned at the outer surface, the agitator gear being farther from the developing roller than the second axis is from the developing roller in the second direction; and a storage medium including an electric contact surface, the electric contact surface being positioned at the outer surface, the electric contact surface facing upward, the electric contact surface being farther from the developing roller than the coup line gear and the agitator gear are from the developing roller in the second direction, the electric contact surface being spaced apart from the coupling in the second direction, wherein the electric contact surface is farther from a distal end of the roller body than the outer surface is from the distal end of the roller body in the first direction.

2. The developing cartridge according to claim 1, wherein the developing roller includes a roller shaft extending in the first direction, the roller shaft being rotatable with the roller body, and wherein the electric contact surface is spaced apart from a distal end of the roller shaft in the second direction.

3. The developing cartridge according to claim 2, wherein the second direction is defined by connecting the roller shaft and the agitator shaft.

4. The developing cartridge according to claim 1, an idle gear rotatable about a fourth axis extending in the first direction, the idle gear being positioned at the outer surface.

5. The developing cartridge according to claim 4, wherein the idle gear meshes with the coupling gear and the agitator gear, the idle gear being positioned between the coupling gear and the agitator gear in the second direction.

6. The developing cartridge according to claim 4, wherein the agitator gear, the idle gear and the coupling are positioned between the developing roller and the electric contact surface in the second direction.

7. The developing cartridge according to claim 1, wherein the electric contact surface is spaced apart from the agitator gear in the second direction.

8. The developing cartridge according to claim 1, wherein the electric contact surface is spaced apart from a distal end of the agitator shaft in the second direction.

9. The developing cartridge according to claim 1, further comprising;

a holder holding the electric contact surface, the holder being positioned at the outer surface, the holder being movable relative to the casing.

10. The developing cartridge according to claim 9, wherein the holder is movable relative to the casing in the first direction.

11. The developing cartridge according to claim 9, wherein the holder is movable relative to the casing in the second direction.

12. The developing cartridge according to claim 9, wherein the holder is movable relative to the casing in a third direction.

13. The developing cartridge according to claim 9, further comprising:

a cover covering the agitator gear, the cover being positioned at the outer surface, wherein the holder is attached to the cover.

14. The developing cartridge according to claim 1, further comprising:

a detection protrusion movable according to the rotation of the coupling, the detection protrusion being positioned at the second side of the casing.

15. The developing cartridge according to claim 1, further comprising:

an electrode being positioned at the second side of the casing, the electrode being electrically connected to a component of the developing cartridge.

16. The developing cartridge according to claim 15, wherein the electrode is electrically connected to a roller shaft.

17. The developing cartridge according to claim 16, wherein a portion of the electrode is spaced apart from the developing roller in the second direction.

18. The developing cartridge according to claim 15, wherein the electrode is formed of conductive resin.

19. The developing cartridge according to claim 15, wherein the electrode is formed of metal.

20. The developing cartridge according to claim 1, wherein the coupling includes a recessed portion configured to receive driving force, the recessed portion being rotatable with the coupling gear.

21. The developing cartridge according to claim 1, wherein the second direction is perpendicular to the first direction.

22. The developing cartridge according to claim 12, wherein the third direction is perpendicular to the first direction.

23. The developing cartridge according to claim 12, wherein the third direction is perpendicular to the second direction.

24. The developing cartridge according to claim 1, wherein the electric contact surface is positioned at the fourth side of the casing.

25. The developing cartridge according to claim 1, wherein the storage medium is positioned at the outer surface.

26. The developing cartridge according to claim 1, wherein the casing includes a through-hole penetrating the second side of the casing, a cap being attached to the through-hole.

27. The developing cartridge according to claim 26, wherein the agitator shaft is farther from the developing roller than the cap is from the developing roller in the second direction.

28. The developing cartridge according to claim 1, wherein the storage medium stores information regarding the developing cartridge.

29. The developing cartridge according to claim 1, wherein the electric contact surface is positioned at an opposite side of the distal end of the roller body relative to the outer surface in the first direction.

30. The developing cartridge according to claim 1, wherein the top surface is spaced apart from the bottom surface in a third direction.

* * * * *